(12) United States Patent
Goetsch et al.

(10) Patent No.: US 8,748,500 B2
(45) Date of Patent: Jun. 10, 2014

(54) PROCESS FOR PRODUCING TRANSPORTATION FUELS FROM SYNGAS

(75) Inventors: Duane A. Goetsch, Andover, MN (US); Kym B Arcuri, Tulsa, OK (US); Steven J. Schmit, Elk River, MN (US); Jacqueline R Hitchingham, Anoka, MN (US); Lloyd R. White, Minneapolis, MN (US)

(73) Assignee: SynGas Technology, LLC, Elk River, MN (US)

( * ) Notice: Subject to any disclaimer, the term of this patent is extended or adjusted under 35 U.S.C. 154(b) by 219 days.

(21) Appl. No.: 13/457,202

(22) Filed: Apr. 26, 2012

(65) Prior Publication Data

US 2012/0277330 A1    Nov. 1, 2012

Related U.S. Application Data

(60) Provisional application No. 61/479,707, filed on Apr. 27, 2011.

(51) Int. Cl.
*C07C 27/00* (2006.01)
*C10G 9/36* (2006.01)

(52) U.S. Cl.
USPC ............ 518/700; 518/713; 518/714; 208/133

(58) Field of Classification Search
USPC .......................... 518/700, 713, 714; 208/133
See application file for complete search history.

(56) References Cited

U.S. PATENT DOCUMENTS

| | | | |
|---|---|---|---|
| 4,568,663 | A | 2/1986 | Mauldin |
| 4,919,786 | A | 4/1990 | Hamner et al. |
| 4,923,841 | A | 5/1990 | Hamner et al. |
| 6,800,665 | B1 | 10/2004 | Shikada et al. |
| 7,015,255 | B1 | 3/2006 | Tomura et al. |
| 7,033,972 | B2 | 4/2006 | Shikada et al. |
| 7,820,867 | B2 | 10/2010 | Joensen et al. |

*Primary Examiner* — Jafar Parsa
(74) *Attorney, Agent, or Firm* — Henry E. Naylor

(57) ABSTRACT

A process for producing transportation fuels, such as gasoline and diesel fuel, from syngas with a low $H_2/CO$ ratio. The syngas is first converted to dimethyl ether which is then converted to gasoline by way of a dimethyl ether to gasoline process and to diesel fuel by way of a Fischer-Tropsch process.

12 Claims, 1 Drawing Sheet

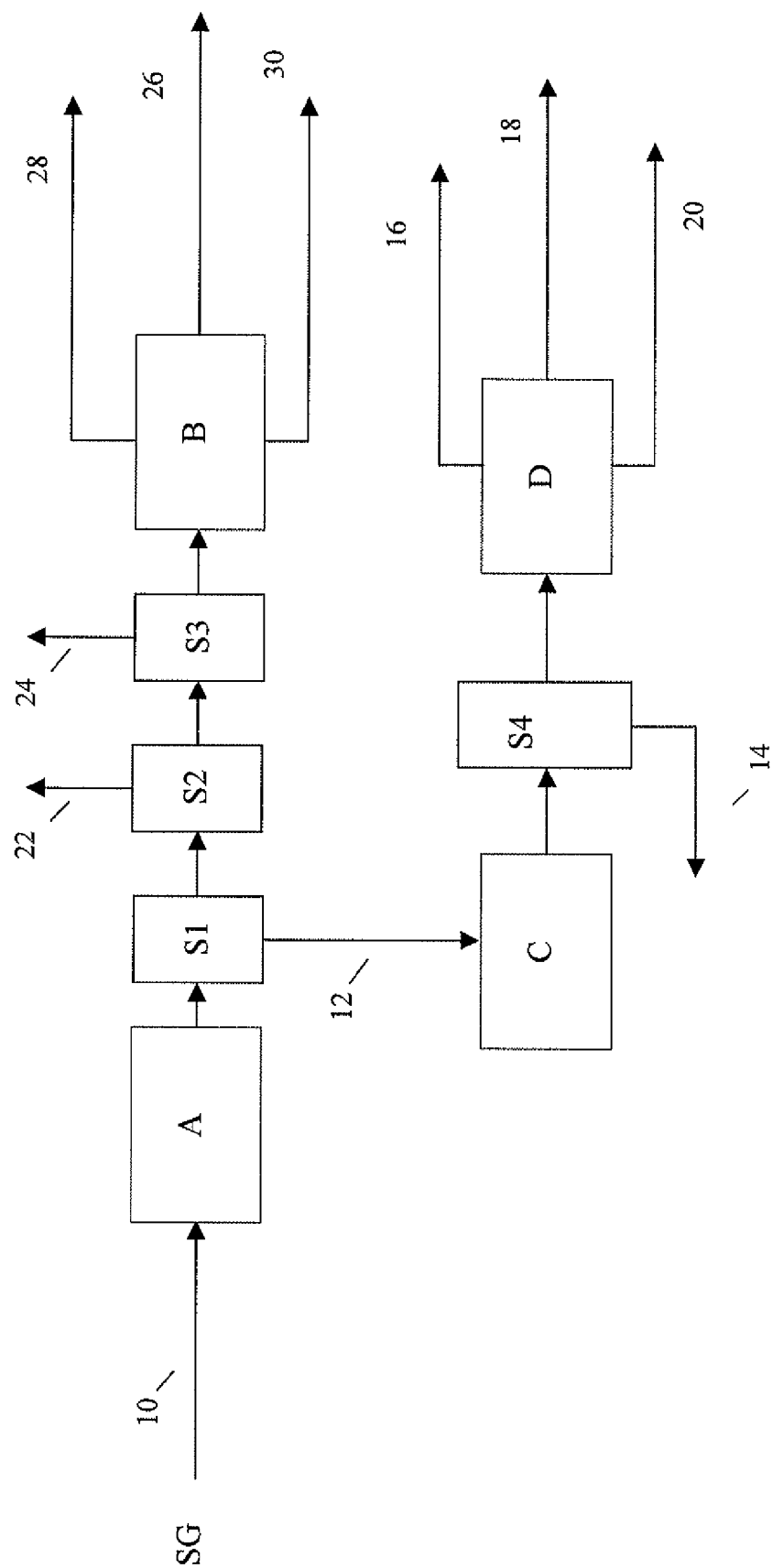

PROCESS FOR PRODUCING TRANSPORTATION FUELS FROM SYNGAS

FIELD OF THE INVENTION

This invention relates to a process for producing transportation fuels, such as gasoline and diesel fuel, from syngas with a relatively low $H_2/CO$ ratio. The syngas is first converted to dimethyl ether which is subsequently converted to gasoline by way of a dimethyl ether to gasoline process and to diesel fuel by way of a Fischer-Tropsch process.

BACKGROUND OF THE INVENTION

There is a significant effort taking place in many parts of the world to produce transportation fuels, particularly gasoline and diesel fuels, from energy sources other than petroleum. For example, research and development in Fischer-Tropsch technology has been on-going for several decades to produce diesel fuels from syngas derived from natural gas and coal. More recently, there is a significant effort taking place to convert renewable resources, such as biomass and triglycerides to transportation fuels. Before biomass can be converted to a transportation fuel via the Fischer Tropsch or similar process (synthetic fuel, or synfuel), it must first be converted to a syngas comprised primarily of CO and $H_2$, which can then be sent to downstream processing to produce various chemical and transportation fuel products. Conversion of biomass to syngas is typically accomplished by gasification that converts the biomass into predominantly carbon monoxide and hydrogen (syngas) by reacting the carbonaceous material of the biomass at high temperatures with a controlled amount of oxygen and/or steam. The resulting syngas can be, inter alia, burned directly in internal combustion engines, used to produce methanol and hydrogen, or methanol and dimethyl ether, or converted via the Fischer-Tropsch process into synthetic fuels.

Syngas produced from biomass has a different characteristic composition than syngas produced from coal or natural gas because of differences in the heating value and chemical composition of biomass, coal, and natural gas. Specifically, syngas produced from biomass has a significantly lower $H_2/CO$ ratio than syngas produced from coal or natural gas. As such, processes originally developed to convert high ratio ($H_2/CO>2$) syngas from natural gas or coal will be inefficient when applied to biomass. One way to overcome this problem is to "shift" the ratio of syngas produced from biomass to a higher ratio via the water-gas shift reaction. This can result in higher ratio syngas, but can be thermally inefficient due to the requirement to produce steam and result in lower carbon yield from the process. For this reason, it is desirable to develop new processes that can efficiently utilize low ratio syngas produce from biomass or other carbonaceous feed stocks with low heating value.

There are two well established processes to convert syngas to liquid transportation fuels. The Fischer Tropsch process converts syngas to diesel fuel and utilizes syngas with a ratio greater than 2:1 $H_2/CO$. The MTG, or methanol to gasoline process, produces gasoline from syngas via a methanol intermediate. Production of methanol also requires syngas with a $H_2/CO$ ratio greater than 2. One notable feature of the MTG process is the first step in the process is to dehydrate methanol to produce dimethyl ether intermediate which is utilized in situ in the process to produce gasoline via subsequent catalytic reaction. One potential process to produce gasoline from syngas is to skip the methanol intermediate and synthesize dimethyl ether directly from syngas.

If the syngas is converted to dimethyl ether, the dimethyl ether can be used directly as a transportation fuel, or catalytically converted to gasoline. For example, JFE Holdings, Inc. of Japan is the assignee of a family of United States patents, including U.S. Pat. Nos. 6,800,665; 7,015,255 and 7,033,972 all of which are incorporated herein by reference, that teach the production of dimethyl ether from either the dehydration of methanol, or directly from a raw material gas comprised of CO and $H_2$. One advantageous feature of this process is that it utilizes low ratio syngas, theoretically 1:1 $H_2/CO$, so that syngas derived from biomass can be efficiently utilized without the need to increase the $H_2/CO$ ratio via the water-gas shift reaction. U.S. Pat. No. 7,820,867, which is also incorporated herein by reference, teaches a process for converting syngas to easily convertible oxygenates, such as methanol or methanol and dimethyl ether, then to gasoline over a zeolite type catalyst, such as ZSM-5. Because the consumption ratio of the direct DME route is 1:1, feeding this process a syngas composition above this ratio can result in a tail gas that has higher ratio than the initial syngas, making the tail gas a good candidate feed for other processes, such as the Fischer Tropsch process that requires a higher ratio syngas.

Combining the unique characteristics of these known processes in novel ways can result in unexpected increases in efficiency and yield compared to the conventional art.

SUMMARY OF THE INVENTION

In accordance with the present invention there is provided a process for producing at least one transportation fuel boiling range stream from syngas, which syngas is comprised predominantly of hydrogen and carbon monoxide, up to about 20 volume percent of other moieties, substantially no sulfur, and has a hydrogen to carbon monoxide ratio of about 1 to about 1.5, which process comprising:

a) reacting said syngas in a first reaction vessel in the presence of a bifunctional catalyst, at pressures from about 400 psi to about 1,000 psi and at a temperature from about 150° C. to 400° C. for an effective residence time, thereby resulting in product stream comprised of dimethyl ether, methanol, unreacted syngas at a higher hydrogen to carbon monoxide ratio than the feed ratio, water, and carbon dioxide;

b) conducting said product stream to a first separation zone wherein the stream is cooled and condensed, thereby resulting in a gaseous product stream comprised of unreacted syngas and a first separated liquid product stream comprised substantially of dimethyl ether, methanol, water and dissolved carbon dioxide;

c) conducting said first separated liquid product stream to a second separation zone wherein at least a portion of said carbon dioxide is removed thereby resulting in a second separated liquid product stream comprised of dimethyl ether, methanol, and water;

d) conducting said second separated liquid reaction product stream to a third separation zone wherein at least a fraction of the methanol and water are removed, thereby resulting in a third separated liquid product stream comprised of predominantly dimethyl ether;

e) conducting at least a portion of said third liquid product stream to a second reaction vessel wherein it is contacted with a ZSM-5 catalyst at a pressure from about 300 to about 400 psi and a temperature of about 300° C. to about 400° C. for an effective amount of time to produce a reaction product stream comprised of gasoline boiling range hydrocarbons, fuel gas, and water;

f) conducting at least a fraction of said unreacted syngas from step b) above to a Fischer-Tropsch synthesis zone wherein it is reacted under Fischer-Tropsch conditions and in the presence of hydrogen and a Fischer-Tropsch catalyst to produce a product stream comprised of an aqueous portion and a hydrocarbon portion;

g) conducting said product stream from said Fischer-Tropsch synthesis zone to a fourth separation zone wherein at least a fraction of the aqueous portion is separated from the hydrocarbon portion;

h) conducting said hydrocarbon portion to a hydroconversion zone operated at temperatures ranging from 250° C. to 400° C., pressures from about 15 kg/cm$^2$ to 175 kg/cm$^2$ in the presence of a hydroisomerization catalyst to result in a product stream comprised of hydroconverted hydrocarbons;

i) conducting said product stream of hydroconverted hydrocarbons to a fractionation zone wherein said stream is fractionated to result in at least one transportation fuel product.

In a preferred embodiment of the present invention the syngas is derived from the gasification of a biomass.

BRIEF DESCRIPTION OF THE FIGURE

FIG. 1 hereof is a simplified process flow diagram of the process of the present invention for converting a syngas to gasoline and optionally to a diesel fuel as well.

DETAILED DESCRIPTION OF THE INVENTION

Syngas streams suitable for use in the present invention are those having a hydrogen to carbon monoxide ratio of greater than 1 but less than or equal to 1.5, preferably greater than 1.1 but less than 1.4, and most preferably between 1.2 and 1.3. The syngas stream will also contain substantially no sulfur moieties and no water, but can contain up to about 20 wt. % of other moieties, the major portion up to 100% will be carbon dioxide, preferably up to about 15 wt. %, more preferably up to about 10 wt. %, even more preferably up to about 7 wt. %, and most preferably up to about 5 wt. %. The sum of hydrogen plus carbon monoxide will preferably be greater than 80 wt. %.

Although the syngas stream can be derived from any source as long as it meets the above requirements, it is preferred that it be derived from a renewable source, preferably from a biomass, and more preferably from lignocellulosic feedstock. The "lignocellulosic feedstock," can be any type of plant biomass such as, but not limited to, non-woody plant biomass, cultivated crops, such as, but not limited to, grasses, for example, but not limited to, C4 grasses, such as switchgrass, cord grass, rye grass, miscanthus, reed canary grass, or a combination thereof, or sugar processing residues such as bagasse, or beet pulp, agricultural residues, for example, soybean stover, corn stover, rice straw, rice hulls, barley straw, corn cobs, wheat straw, canola straw, rice straw, oat straw, oat hulls, corn fiber, recycled wood pulp fiber, sawdust, hardwood, for example aspen wood and sawdust, softwood, or a combination thereof. Further, the lignocellulosic feedstock may include cellulosic waste material such as, but not limited to, newsprint, cardboard, sawdust, and the like. For urban areas, the best potential plant biomass feedstock includes yard waste (e.g., grass clippings, leaves, tree clippings, and brush) and vegetable processing waste.

Lignocellulosic feedstocks can include one species of fiber or alternatively, a mixture of fibers that originate from different lignocellulosic feedstocks. Furthermore, the lignocellulosic feedstock can comprise fresh lignocellulosic feedstock, partially dried lignocellulosic feedstock, fully dried lignocellulosic feedstock, or a combination thereof. In general, the term "biomass" as used herein includes all of the terms, plant biomass, lignocellulosic, cellulosic, and hemicellulosic. It is preferred that the biomass used in the practice of the present invention be comprised of at least about 30 wt. % cellulose, based on the total weight of the biomass.

It is also preferred that the biomass be converted to a syngas by gasification, more preferred by a gasification process disclosed in co-pending U.S. patent application Ser. No. 12/767,601 filed on Apr. 26, 2010 which is incorporated herein by reference. The biomass is preferably dried before feeding to a gasifier. It is preferred that the biomass, after drying, contain no more than about 20 wt. %, preferably not more that about 15 wt. %, and more preferably no more than about 10 wt. % water, based on the total weight of the biomass after drying. The biomass is subjected to a size reduction step to reduce it a size suitable for gasification in the first stage or for feed to a torrefaction step. It is preferred that the size reduction step produce a biomass having a particle size of about 1 micron to about 3 inches, preferably from about 150 microns to about 1.5 inches, and more preferably from about 300 microns to 1.5 inches. The fibrous structure of the biomass makes it very difficult and costly to reduce its particle size. Non-limiting examples of mechanical size reduction equipment include rotary breakers, roll crushers, jet mills, cryogenic mills, hammermills, impactors, tumbling mills, roller mills, shear grinders, and knife mills. Hammermills are preferred for the practice of the present invention.

It is more preferred that the biomass be reduced in size after torrefying it at moderate temperatures in a substantially oxygen-free atmosphere. Torrefaction increases the energy density of cellulosic materials by decomposing the fraction of hemicelluloses that is reactive. The energy content per unit mass of torrefied product is increased. Much of the energy lost during torrefaction is in an off-gas (tor-gas) that contains combustibles, which can be burned to provide some of the heat required by the torrefaction process. A preferred torrefaction process is taught in co-pending U.S. patent application Ser. No. 12/825,887 filed on Jun. 29, 2010 which is also incorporated herein by reference.

Torrefaction of biomass of the present invention is conducted at temperatures from about 200° C. to about 350° C., preferably from about 220° C. to about 320° C., more preferably from about 250° C. to about 300° F. During torrefaction, the biomass properties are changed, which results in better fuel quality for combustion and gasification applications. Typically, torrefaction is followed by pelletizing to yield a product that is suitable as a fuel substitute for coal. In this case, the torrefied biomass of the present invention need not be pelletized, but is instead reduced to a particle size that will be suitable for use in a fluid-bed gasifier. This particle size will typically be in the range of about 1 micron to 300 microns, preferably from about 150 microns to about 300 microns. In the torrefaction process of the present invention, the hemicelluloses and, depending on severity, some of the constituents in the biomass undergo hydrolysis and dehydration reactions. The process primarily removes $CH_3O-$, $HCOO-$, $CH_3COO-$ functional groups from the hemicellulose and lignin. Hydrolysis reactions can also cleave the C—O—C linkages in the polymeric chains that comprise the major constituents in the biomass. The acidic components in the tor-gas and the ash components in the biomass have the potential to catalyze these reactions. The torrefaction process produces a solid product having higher energy density than the feedstock and a tor-gas. The solid product can result in char during gasification and can contribute to heat balance needed for the gasifier. Particle size reduction can also occur during this process as a result of chemical action rather than mechanical actions as in grinding. Overall, the process uses less electrical power to achieve a desired degree of size reduction than mechanical size reduction without torrefaction.

The gasification process as applied to the conversion of carbonaceous materials involves many individual reactions associated with conversion of carbon, hydrogen, and oxygen into products involving steam, hydrogen, oxides of carbon, soot or tars and hydrocarbons. At elevated temperatures (>530° C.) associated with gasification, the major products are typically steam and syngas comprised of hydrogen, $CO_2$, CO and methane. Chars and soot represent compounds rich in carbon and may contain small amounts (<5%) of hydrogen.

Gasifiers can be classified with respect to how they provide heat. Indirect gasifiers utilize heat transfer tubes or other surfaces within the gasifier reactor. An external source of hot gas passes through the tubes or other surfaces to provide heat to the gasification reactor. The maximum operating temperature for these types of gasifiers is typically <870° C. due to the material limitations associated with the heat transfer surfaces. Expensive high temperature metal alloys, or other heat transfer materials, can be utilized; however, the mechanical complications associated with thermal stress prohibit operations in the desired range of 980° C. High temperature gasifiers (>980° C.), such as those utilized for the gasification of coal, employ $O_2$ in the feed and provide the necessary thermal energy for driving the endothermic reactions through partial oxidation. This use of internally generated heat is referred to as a "direct" or $O_2$-blown gasifier which can achieve almost complete conversion of the feed carbon. Coal gasifiers (direct type) generally operate in what is referred as the slagging mode since the temperatures achieved within the partial oxidation zone are very high (>1100° C.) and the inorganic constituents (also referred to as ash) undergo "fusion" or are converted to liquids that collect at the bottom of the gasifier and are periodically or continuously drawn out of the system. However, when this technology is applied to biomass, issues arise due to the inorganic content within the feed matrix. Biomass typically contains higher concentrations of inorganic constituents which can undergo fusion at lower temperatures as well as vaporize at elevated temperatures and deposit on downstream equipment causing fouling of heat transfer surfaces and operational problems.

Commercial gasifier systems that employ $O_2$ to supply thermal energy through partial oxidation typically generate localized hot spots at the injection point or zone. The reaction of oxygen in the gasification environment is very fast and for all practical purposes occurs within the jet volume associated with the $O_2$ injection nozzle. The $O_2$ jet forms essentially a volume around the nozzle that is referred to as the partial oxidation, or pox, zone. Within this volume, localized temperatures can approach the adiabatic flame temperature determined by the combustion of the available oxygen and the local fuel which is typically synthesis gas. It will be understood that the terms synthesis gas, syngas, and synthetic gas are used interchangeably herein. The endothermic reactions (gasification and pyrolysis) do not occur as fast as oxidation and consequently more chemical heat is generated than removed. One possible way to mitigate the high temperatures is to transfer cooler solids and gas through the partial oxidation (pox) region. A fluidized bed reactor using inert solids provides geometry and thermal mass to mitigate the higher temperatures. A solid with catalytic properties will provide additional heat mitigation through promotion of the steam reforming of gaseous hydrocarbons produced through pyrolysis. For example, adding an effective amount of potassium to the circulating solids will catalyze the gasification rate of gaseous intermediates produced from the biomass.

Another way to mitigate the high temperatures is to use pulsed oxygen injection as taught in co-pending U.S. patent application Ser. No. 12/767,501 so as to keep the maximum temperature within the oxygen injection region (referred to as the flame zone) below the fusion temperature of the biomass. This method for controlling this temperature involves the periodic injection of oxygen at a flow rate and frequency that prevents the attainment of temperatures approaching or exceeding the fusion temperature of the inorganic constituents within the biomass feed. Additionally, operating at temperatures in the range of about 760° C. to about 870° F. reduces the extent of volatility of these constituents, thereby minimizing fouling on downstream equipment.

Temperature control using pulsed oxygen is practiced in both stages when oxygen is used. However, the second stage (combustor) can also make use of air, which can be fed continuously. The biomass feed is preferably introduced through a riser exiting at or near the bottom of the first stage fluid bed in which both pyrolysis and gasification occur simultaneously. The lift gas employed by the riser is preferably comprised of a steam/carbon dioxide mixture. Variation of the lift gas composition influences the extent of pyrolysis and hydrolysis reactions that occur in the riser. Variation in the lift gas composition influences the fluidization properties of the particulate biomass, most importantly its tendency to agglomerate. The feed system is oriented to provide maximum contact of the biomass with the oxygen, steam and other fluidizing gases within the fluid bed. The use of both steam and oxygen minimizes the extent of pyrolysis; however, this reaction will still proceed to some extent resulting in the production of tars, soot and other carbon rich solids which inherently gasify at a much slower rate than the parent biomass feed. The heat required in the first stage is significant since most of the biomass gasification and all of the pyrolysis occurs in this stage (endothermic reactions). This first stage is operated at a lower temperature (530° C.-870° C.) than the second stage, which is operated at a temperature at least 10° C. greater, preferably at least about 35° C. greater than the first stage in order to reduce the potential for high temperatures within the pox zone. It is preferred that the second stage not be operated at temperatures greater than 1100° C., more preferably no greater than about 1040° C. The upper temperature of this second stage is the point where an undesirable amount of slag is formed.

The carbon-rich phase formed in the first stage is comprised of char and other carbon rich intermediates arising from pyrolysis as well as unreacted biomass. The gaseous phase contains $H_2$, CO, $CO_2$, $H_2O$ and $CH_4$ as well as minor amounts of other hydrocarbons arising from the pyrolysis reaction. At least a portion, preferably substantially all, of the gaseous phase (syngas) from the first stage is removed as a final product, while the carbon-rich solid phase is sent to the second stage, which, as has been mentioned previously, is operated at a higher temperature than the first stage in order to facilitate the combustion of the tars and other carbon rich solids.

The present invention can be better understood with reference to FIG. 1/1 hereof which is a simplified process flow scheme for practicing one preferred embodiment of the present invention. A syngas feedstream SG is conducted via line 10 to reaction zone A where it is reacted with a bifunctional catalyst at effective reaction conditions. Effective reaction conditions include temperatures ranging from about 150° C. to about 400° C., preferably from about 200° C. to about 350° C. Reaction temperatures lower than about 150° C. and above 400° C. will typically degrade the conversion of carbon monoxide. Reaction pressures will typically range from about 10 to 300 kg/cm$^2$, preferably from about 15 to 150 kg/cm$^2$. Reaction pressures below about 10 kg/cm$^2$ results in a low conversion of carbon monoxide, and that above 300 kg/cm$^2$ requires a special design of the reactor and is uneconomical because of the need for a large amount of energy pressurizing the system. Suitable bifunctional catalysts for the conversion of syngas for reaction zone A include catalysts such as a copper oxide-zinc oxide-alumina system or a zinc oxide-chromium oxide-alumina system. A preferred mixing ratio of individual ingredients of copper oxide, zinc oxide, and alumina is: in an approximate range of from 0.05 to 20 wt. parts of zinc oxide to 1 wt. part of copper oxide, more preferably from about 0.1 to about 5 wt. parts and about 0 to 2 wt. parts of alumina, more preferably about 0 to 1 parts by wt. alumina. A preferred mixing ratio will also include zinc oxide, chromium oxide, and alumina in the ratio of about 0.1 to 10, more preferably about 0.5 to 5 wt. parts chromium oxide to about 1 wt. part of zinc oxide, and about 0 to 2 wt. parts of alumina, more preferably from about 0 to 1 wt. parts alumina. As previously mentioned syngas suitable for use herein are those syngas streams having a hydrogen to carbon monoxide ratio of greater than 1 but less than or equal to 1.5, preferably greater than 1.1 but less than 1.4, and most preferably greater than 1.2 but less than 1.3. The syngas stream will also contain substantially no sulfur moieties and no water, but can include up to about 20 wt. % of other moieties, the major portion up to 100% will be carbon dioxide, preferably up to about 15 wt. %, more preferably up to about 10 wt. %, even more preferably up to about 7 wt. %, and most preferably up to about 5 wt. %. The sum of hydrogen plus carbon monoxide will preferably be greater than 80 wt. %.

The resulting liquid product stream comprised of unconverted syngas, dimethyl ether, methanol, water, and dissolved carbon dioxide is sent to a separation zone S1, that is preferably a flash drum, wherein the unconverted syngas is recovered via line 12. The unconverted syngas stream will have a hydrogen to carbon monoxide ratio of about 1.8 and at least a portion of it can be recycled to the reaction zone A (not shown) and/or it can be conducted to Fischer-Tropsch reactor C where it is converted under conventional Fischer-Tropseh conditions and in the presence of a Fischer-Tropsch catalyst to a hydrocarbon liquid product steam which is primarily comprised of paraffinic materials, which are ideal for the production of diesel fuels.

Fischer-Tropsch catalysts are well known in the art and typically contain a Group 8 transition metal on a metal oxide support. The catalysts may also contain a noble metal promoter(s) and/or crystalline molecular sieves. Non-limiting examples of Group 8-10 metals are those selected from the group consisting of Fe, Ni, Co, Ru and Re, with cobalt being preferred. A preferred Fischer-Tropsch catalyst comprises effective amounts of cobalt and one or more of a metal selected from the group consisting of Re, Ru, Pt, Fe, Ni, Th, Zr, Hf, U, Mg and La on a suitable inorganic support material, preferably one which comprises one or more refractory metal oxides. In general, the amount of cobalt present in the catalyst is between about 1 to about 50 wt. % based on the total weight of the catalyst composition. The catalysts can also contain basic oxide promoters such as ThO$_2$, La$_2$O$_3$, MgO, TiO$_2$, and ZrO$_2$, noble metals (Pt, Pd, Ru, Rh, Os, Ir), coinage metals (Cu, Ag, Au), and other transition metals such as Fe, Mn, Ni, and Re. Non-limiting examples of support materials suitable for use herein include alumina, silica, magnesia and titania or mixtures thereof, Useful catalysts and their preparation are known and disclosed in U.S. Pat. No. 4,568,663, which is incorporated herein by reference and which is intended to be illustrative but non-limiting relative to catalyst selection.

The product from Fischer-Tropsch zone C is comprised of a gaseous component and a hydrocarbon liquid component having carbon numbers up to about 100 or more. Fisher-Tropsch liquids are typically comprised of predominantly straight chain paraffins with approximately about 5 to about 10 wt. % olefins and less than about 1 wt. % oxygenates, based on the total weight of the Fischer-Tropsch liquids. The gaseous component is typically comprised of methane, CO$_2$, unreacted syngas, and C$_2$ to C$_7$ hydrocarbons that can be used as local fuel gas. The product stream is sent to a separation zone S4, where water that contains a small amount of alcohols, is separated via line 14. The remaining product stream will be comprised of unreacted syngas and fuel gas, a light hydrocarbon fraction, and a heavy hydrocarbon fraction. The light hydrocarbon fraction will typically be comprised predominantly of hydrocarbons in the carbon range of about C5 to about C20. Less than about 5 wt. % of the C5 to C20 fraction will have hydrocarbons in the range of C20+. The heavy hydrocarbon fraction will typically be comprised of hydrocarbons predominantly in the carbon range of about C8 to C20+. Greater than 75% of the C8 to C20+ fraction will have hydrocarbons in the C20+ range. This remaining product stream from Fischer-Tropsch reaction zone C is sent to a hydroconversion zone D.

Light hydrocracking and predominantly hydroisomerization will take place in hydroconversion zone D. Any suitable predominantly hydroisomerization catalyst can be used for zone D. For example, one type of catalyst that can be used are conventional hydrotreating catalysts containing at least one Group 6 (based on the IUPAC Periodic Table having Groups 1-18) metal and at least one Groups 8-10 metal. Preferred metals include Ni, W, Mo, Co and mixtures thereof. These metals, or mixtures of metals, are typically present as oxides or sulfides on refractory metal oxide supports. The mixture of metals may also be present as bulk metal catalysts wherein the amount of metal is about 30 wt. % or greater, based on the total weight of the catalyst. It is also within the scope of this invention that the active metal for the hydrotreating catalyst be one or more noble metals selected from Pt and Pd with or without a Group 6 metal, preferably without a Group 6 metal. The more preferred catalysts for use in the present invention are fluorided Group 8 metal-on-alumina containing catalyst compositions. The preferred Group 8 metal is platinum and the most preferred alumina containing support is selected from the group consisting of alumina and silica-alumina. It is to be understood that the alumina-containing component may contain minor amounts of other materials, such as, for example, silica, and the alumina herein encompasses alumina-containing materials.

The fluoride Group 8 metal-on-alumina catalyst comprises about 0.1 to about 2 percent, preferably from about 0.3 to about 0.6 percent Group 8 metal and from about 2 percent to about 10 percent fluoride, preferably from about 5 percent to about 8 percent fluoride, based on the total weight of the catalyst composition (dry basis), said fluoride concentration being referred to herein as the bulk fluoride concentration.

The more preferred catalyst of the present invention will have a fluoride concentration less than about 3.0 weight percent, preferably less than about 1.0 weight percent and most preferably less than 0.5 weight percent at its outer surface layer, provided the surface fluoride concentration is less than the bulk fluoride concentration. The outer surface is measured to a depth less than one one hundredth of an inch. The surface fluoride was calculated from the total fluoride analysis and the electron microscope analysis. The remaining fluoride is distributed with the Group 8 metal at a depth below the outer shell into and within the particle interior. Catalysts of the preferred type are described in detail in U.S. Pat. Nos. 4,919,786 and 4,923,841 both of which are incorporated herein in their entirety.

While alumina-containing support materials are preferred, other suitable metal oxide supports include silica and titania. Preferred aluminas are porous aluminas such as gamma or eta alumina. The acidity of metal oxide supports can be controlled by adding promoters and/or dopants, or by controlling the nature of the metal oxide support, e.g., by controlling the amount of silica incorporated into a silica-alumina support. Non-limiting examples of promoters and/or dopants suitable for use herein include halogen (especially fluorine), phosphorus, boron, yttria, rare-earth oxides and magnesia. Promoters, such as halogens, generally increase the acidity of metal oxide supports while mildly basic dopants, such as yttria and magnesia, tend to decrease the acidity of such supports. Fluorine is the most preferred promoter.

Effective hydroconversion conditions that can be used herein include temperatures from about 250° C. to about 400° C., preferably about 270° C. to about 350° C., pressures of from about 791 to about 20786 kPa (about 100 to about 3000 psig), preferably about 15 kg/cm to about 175 kg/cm$^2$ (about 200 to about 2500 psig), liquid hourly space velocities of from about 0.1 to about 10 hr$^{-1}$, preferably about 0.1 to about 5 hr$^{-1}$ and hydrogen treat gas rates from about 45 to about 1780 m$^3$/m$^3$ (about 250 to about 10000 scf/B), preferably about 89 to about 890 m$^3$/m$^3$ (about 500 to about 5000 scf/B.

The hydroconversion step can be comprised of one or more fixed bed reactors, or reaction zones within a single reactor, each of which can comprise one or more catalyst beds of the same, or different, catalyst. Although other types of catalyst beds can be used, fixed beds are preferred. Such other types of catalyst beds suitable for use herein include fluidized beds, ebullating beds, slurry beds, and moving beds. Interstage cooling or heating between reactors or reaction zones, or between catalyst beds in the same reactor or reaction zone, can be employed since the reaction is generally exothermic. A portion of the heat generated during hydrotreating can be recovered. Where this heat recovery option is not available, conventional cooling may be performed through cooling utilities, such as cooling water or air, or through use of a hydrogen quench stream. In this manner, optimum reaction temperatures can be more easily maintained.

The reaction product from the hydroconversion zone is fractionated to produce a fuel gas stream via line 16, a diesel boiling range stream via line 18, and a low octane naphtha stream via line 20. The low octane gasoline (naphtha) stream via line 20 that can be blended with the gasoline stream obtained via line 26 from reaction zone B.

Returning now to separation zone S1, the remaining liquid stream from separation zone S1, which will be comprised of dimethyl ether, methanol, water and dissolved carbon dioxide is conducted to separation zone S2 where at least a portion, preferably substantially all, of the carbon dioxide is removed via line 22. The remaining liquid product stream, which is now primarily comprised of dimethyl ether, methanol, and water are conducted to third separation zone S3 wherein dimethyl ether is separated from the methanol and water which is removed via line 24. The remaining dimethyl ether stream is conducted to reaction zone B wherein at least a portion of it is converted to gasoline which is collected via line 26. A fuel gas will also be a product from reaction zone B, via line 28. An aqueous waste stream can be removed via line 30. The catalyst of reaction zone B is preferably a crystalline aluminosilicates are ZSM-5, ZSM-11, ZSM-12, ZSM-21 and TEA mordenite, with ZSM-5 particularly preferred. The catalysts of this invention may be in the hydrogen form or they may be base exchanged or impregnated to contain ammonium or a metal cation complement. It is desirable to calcine the catalyst after base-exchange. The metal cations that may be present include any of the cations of the metals of Groups 1 through VIII of the periodic table of the elements. However, in the case of Group IA metals, the cation content should in no case be so large as to effectively inactivate the catalyst. For example, a completely sodium exchanged H-ZSM-5 is not operative in the present invention. Reaction conditions of reaction zone B will be at a temperature of about 260° C. to 550° C., preferably about 315° C. to 425° C., a pressure from sub-atmospheric to about 50 atmospheres, and at a liquid hourly space velocity of about 0.1 to 50 LHSV.

What is claimed is:

1. A process for producing at least one transportation fuel boiling range stream from syngas, which syngas is comprised predominantly of hydrogen and carbon monoxide, up to about 20 volume percent of other moieties, substantially no sulfur, and has a hydrogen to carbon monoxide ratio of about 1 to about 1.5, which process comprising:

a) reacting said syngas in a first reaction zone in the presence of a bifunctional catalyst, at pressures from about 400 psi to about 1,000 psi and at a temperature from about 150° C. to 400° C. for an effective residence time, thereby resulting in product stream comprised of dimethyl ether, methanol, unreacted syngas at a higher hydrogen to carbon monoxide ratio than the feed ratio, water, and carbon dioxide;

b) conducting said product stream to a first separation zone wherein the stream is cooled and condensed, thereby resulting in a gaseous product stream comprised of unreacted syngas and a first separated liquid product stream comprised substantially of dimethyl ether, methanol, water and dissolved carbon dioxide;

c) conducting said first separated liquid product stream to a second separation zone wherein at least a portion of said carbon dioxide is removed thereby resulting in a second separated liquid product stream comprised of dimethyl ether, methanol, and water;

d) conducting said second separated liquid reaction product stream to a third separation zone wherein at least a fraction of the methanol and water are removed, thereby resulting in a third separated liquid product stream comprised of predominantly dimethyl ether;

e) conducting at least a portion of said third liquid product stream to a second reaction zone wherein it is contacted with a catalyst selected from the group consisting of ZSM-5, ZSM-11, ZSM-12, ZSM-21 and TEA mordenite, at a pressure from about sub-atmospheric to about 50 atmospheres and a temperature of about 260° C. to about 550° C. for an effective amount of time to produce a reaction product stream comprised of gasoline boiling range hydrocarbons, fuel gas, and water;

f) conducting at least a fraction of said unreacted syngas from step b) above to a Fischer-Tropsch synthesis zone wherein it is reacted under Fischer-Tropsch conditions and in the presence of hydrogen and a Fischer-Tropsch catalyst to produce a product stream comprised of an aqueous portion and a hydrocarbon portion;

g) conducting said product stream from said Fischer-Tropsch synthesis zone to a fourth separation zone wherein at least a fraction of the aqueous portion is separated from the hydrocarbon portion;

h) conducting said hydrocarbon portion to a hydroconversion zone operated at temperatures ranging from 250° C. to 400° C., pressures from about 15 kg/cm$^2$ to 175 kg/cm² in the presence of a hydroisomerization catalyst to result in a product stream comprised of hydroconverted hydrocarbons;

i) conducting said product stream of hydroconverted hydrocarbons to a fractionation zone wherein said stream is fractionated to result in at least one transportation fuel product.

2. The process of claim 1 wherein the syngas is obtained from a biomass.

3. The process of claim 2 wherein the biomass is selected from the group consisting of non-woody plant biomass, cultivated crops, grasses, sugar processing residues, agricultural residues, and a combination thereof.

4. The process of claim 1 wherein the hydrogen to carbon monoxide ratio of the syngas feed is from about 1.1 to about 1.4.

5. The process of claim 4 wherein the hydrogen to carbon monoxide ratio of the syngas feed is from about 1.2 to about 1.3.

6. The process of claim 1 wherein substantially all of the water is removed from the second separated liquid reaction product in the third separation zone.

7. The process of claim 1 wherein substantially all of the methanol and water are removed from the second separated liquid reaction product in the third separation zone.

8. The process of claim 1 wherein the catalyst of the first reaction zone is selected from the group consisting of copper oxide-zinc oxide-alumina, and zinc oxide-chromium oxide-alumina.

9. The process of claim 1 wherein at least a portion of any unreacted syngas from any of the separation zones is recycled to said first reaction zone.

10. The process of claim 1 wherein the temperature of the first reaction zone is from about 200 to about 350° C.

11. The process of claim 1 wherein the catalyst used in the second reaction zone is a ZSM-5 catalyst.

12. The process of claim 1 wherein the temperature of said second reaction zone is from about 315° C. to about 425° C.

* * * * *